(12) United States Patent
Costello et al.

(10) Patent No.: US 11,434,011 B1
(45) Date of Patent: *Sep. 6, 2022

(54) ONE-TIME FLARE MECHANISM

(71) Applicant: Earthly Dynamics, LLC, Atlanta, GA (US)

(72) Inventors: Mark F Costello, Atlanta, GA (US); Michael Brian Ward, Atlanta, GA (US)

(73) Assignee: Earthly Dynamics, LLC, Atlanta, GA (US)

( * ) Notice: Subject to any disclaimer, the term of this patent is extended or adjusted under 35 U.S.C. 154(b) by 399 days.

This patent is subject to a terminal disclaimer.

(21) Appl. No.: 16/055,122

(22) Filed: Aug. 5, 2018

(51) Int. Cl.
*B64D 17/34* (2006.01)
*B64D 17/38* (2006.01)

(52) U.S. Cl.
CPC ............. *B64D 17/34* (2013.01); *B64D 17/38* (2013.01)

(58) Field of Classification Search
CPC ................................ B64D 17/34; B64D 17/38
See application file for complete search history.

(56) References Cited

U.S. PATENT DOCUMENTS

| | | | |
|---|---|---|---|
| 2,308,797 A | 1/1943 | Nasca | |
| 2,610,008 A | 9/1952 | Smith | |
| 2,736,524 A | 2/1956 | Thebault | |
| 3,146,976 A | 9/1964 | Houdou | |
| 3,323,762 A | 6/1967 | Mylrea, Sr. | |
| 3,384,330 A | 5/1968 | Rollins | |
| 3,433,441 A | 3/1969 | Cummings | |
| 3,721,409 A | 3/1973 | Matsuo | |
| 3,829,046 A | 8/1974 | Matsuo | |
| 4,687,160 A | 8/1987 | Logemann | |
| 5,248,117 A | 9/1993 | Hennings | |
| 6,505,793 B2 | 1/2003 | Schwarzler | |
| 6,514,115 B2 | 2/2003 | Harich | |
| 6,808,144 B1 | 10/2004 | Nicolai | |
| 6,962,308 B2 * | 11/2005 | Schwaerzler | B64D 17/34 244/149 |
| 7,059,570 B2 | 1/2006 | Strong | |
| 8,215,588 B2 | 1/2012 | Wrage | |
| 10,137,995 B1 * | 11/2018 | Costello | B64D 1/08 |
| 10,207,811 B2 * | 2/2019 | Biehl | B64D 17/025 |

* cited by examiner

*Primary Examiner* — Jessica B Wong
(74) *Attorney, Agent, or Firm* — Morris, Manning & Martin, LLP; Daniel E. Sineway, Esq.

(57) ABSTRACT

A one-time flare mechanism system for use with an aerial payload system is describe which uses minimal actuation force to produce a reliable flare with minimal shock to the payload, parafoil and rigging.

4 Claims, 5 Drawing Sheets

ONE-TIME FLARE MECHANISM

STATEMENT OF GOVERNMENT INTEREST

The work that lead to certain aspects of this invention was supported in part by the U.S. Army Natick Soldier Research, Development and Engineering Center. Thus, the United States Government may have certain rights to this invention.

CROSS-REFERENCE TO RELATED APPLICATION

The present application is a Continuation-In-Part Application claiming benefit of U.S. application Ser. No. 14/923,619 filed Oct. 27, 2015. The subject matter of that application is hereby incorporated by reference in its entirety.

FIELD OF THE INVENTION

The present invention relates to a mechanism to produce a one-time flare in a reliable manner with minimal shock loads for an aerial payload delivery system.

BACKGROUND OF THE INVENTION

Aerial payload delivery systems offer the capability to deliver large payloads and or people to undeveloped or inaccessible locations. The canopies in these systems are well known and often referred to as parafoils from which payloads may be suspended via rigging lines or control lines. The parafoils are generally constructed of an upper canopy and a lower canopy connected by a cell structure, also known as ribs, that is well known in the art. The flexible parafoils provide aerodynamic lift by virtue of the shape of the canopy and an alteration in the shape can greatly affect the directionality of the parafoil. A soft landing can be achieved by virtue of a flare maneuver wherein the airspeed is slowed just prior to landing.

Several autonomous guided systems have been developed that use trailing edge brake deflection for lateral control by altering the shape of the parafoil and have been shown to increase landing accuracy. This alteration of the trailing edge may also be used to perform a flare maneuver to allow for softer landing for the payload. Direct control of the trailing edge lines requires actuators capable of producing large control forces, adding to the size, weight, cost and complexity of the system. A one-time flare mechanism releases stored energy to produce a trailing edge deflection one time at a critical point in flight without direct actuation of the trailing edge lines. According to the present invention, a simple one-time flare mechanism is used to slowly equalize the load, avoid shock to the rigging lines and allow for a soft landing.

SUMMARY OF THE INVENTION

The present invention relates to a parafoil payload delivery system wherein a one-time flare mechanism system is used to enable a soft landing for the payload. The parafoil delivery system of the present invention comprises a canopy, rigging lines or suspension lines, a trailing edge control line, a spreader, payload slings, a one-time flare mechanism, and a payload.

In a preferred embodiment, the one-time flare mechanism comprises a purchase system located between the payload and the spreader and a release mechanism system positioned on or associated with the spreader. The spreader is an interface between the parachute rigging and the payload slings is preferably a pack tray coupled to a structure which acts as a spreader and may contain an Autonomous Guidance Unit (hereinafter AGU). However, any similar device may be used as an interface between the parachute rigging and payload slings including a purely passive structure of similar external dimensions to that of an AGU that would maintain proper line spread and be compatible with existing packing and rigging procedures. In a preferred embodiment, the spreader is located such that the release mechanism system is located above the purchase system. The release mechanism system holds in place the trailing edge control line while the terminus of the trailing edge control line is fed into the purchase system. The release of the trailing edge control line by the release mechanism produces a large change in the length of the trailing edge control line and a small change in the length of the purchase system.

In a further embodiment, the release mechanism system is further comprised of a release mechanism, a control line mechanism wherein the control line mechanism is releasable from the release mechanism. The release mechanism is preferably positioned on or associated with the spreader and the control line mechanism is preferably positioned on or associated with the trailing edge control line. The release mechanism and control line mechanism work together to hold the trailing edge line in place until the release mechanism releases the control line mechanism. In a preferred embodiment the release mechanism system is comprised of a 3-ring release system that is known in the art, see for example U.S. Pat. No. 4,337,913. In this preferred embodiment, the control line mechanism comprises the small ring, middle ring and cord loop and the large ring would comprise the release mechanism. The loop cord is held in place by the semi-rigid cable or hook until the cord is released by a small tug of the semi-rigid cable. The release of the control mechanism may be pre-programmed within the AGU or may be triggered remotely or wirelessly just prior to the landing of the payload. It is understood that any, known releasable control line mechanisms and release mechanisms may be used including an pin-and-loop, hook-and-latch, magnetic or any other known hook and/or latch method.

In another preferred embodiment, the upper payload slings are attached to an upper link and the lower payload slings are attached to a lower link. The payload slings are preferably attached to a swivel, to prevent twisting, and the swivel is then attached to the lower link. Alternatively, the swivel and lower link may be integrated into one unit. The links and the swivel may be of any kind appropriate for the payload. The purchase system of the preferred embodiment is located in between the upper link and lower link. The purchase system of the preferred embodiment is comprised of a series of pulleys attached to the upper and lower links. Preferably there will be at least two pulleys located on the upper link and two on the lower link, however, the number of pulleys is dependent upon the size of the payload and the size of the pulleys. The trailing edge control line is threaded through the first pulley on the lower link, then through the first pulley on the upper link, through the second pulley on the lower link, through the second pulley on the upper link and then the terminus of the trailing edge control line is attached to the lower link. In a preferred embodiment, pulleys are used, however any device that allows for the threading of the trailing edge control line may be used, such as a ring or loop. In a further embodiment, the device(s) that allow for the threading of the trailing edge control line may be an integrated part of the upper and/or lower links. The links may be of any kind, including, but not limited to buckles, detachable, separable, solid, quick release, D ring, canopy rigging link with a bolt and suspension lug and may be comprised of metal or any other material suitable to support the payload. Alternative purchase systems may be used, including, but not limited to a drum wherein the trailing edge control line is threaded around a drum.

In another preferred embodiment, the purchase system may be located above the spreader. In this embodiment, the swivel is attached to the lower and upper payload slings and the upper payload slings are attached to the spreader. The suspension lines are connected to or associated with a riser, or multiple risers. The riser(s) are then attached to the upper link while the lower link is attached to the spreader. The purchase system is located between the upper and lower links. In this embodiment, the release mechanism system is comprised of a release mechanism that is preferably located on or associated with the riser and a control line mechanism that is preferably positioned on or associated with the trailing edge control line.

In a further embodiment, the purchase system may be located within the spreader. In this embodiment, the trailing edge control line is threaded through the release mechanism system located on the exterior of the spreader and to the lower link which is attached to the interior of the spreader, preferably, a side wall. In this embodiment, the riser is attached to a riser control line. The riser control line is threaded into the spreader and through a pulley located on the upper interior surface of the spreader and then through another pulley located on an interior side surface of the spreader that is opposite of location of the lower link. The riser control line is then attached to the upper link. The purchase system is located between the upper link and lower link.

In another embodiment, the one-time flare mechanism comprises an internal pulley mechanism located within the spreader. The internal pulley comprises a single pulley with two grooves, an upper groove and lower groove, with different radii. In this embodiment, the upper groove is smaller in radius than the lower groove. The trailing edge control line is threaded through the spreader to an idler pulley and then is threaded on to the lower groove. In this embodiment each canopy riser is attached to a riser control line that is threaded into the spreader and attached to the upper groove. The release mechanism system of this embodiment comprises a release mechanism and a control mechanism that collectively prevent the movement of the internal pulley until the release mechanism is released. In a preferred embodiment, the release mechanism is a pin and the control mechanism is an aperture that holds the pin in place, but it is understood that any acceptable device for preventing movement of the internal pulley may be used. In a preferred embodiment, the trailing edge control line is secured to the lower groove at the location of the control mechanism. However, it is understood that the release mechanism and control mechanism may be placed at any location and that the trailing edge control line may be secured at any acceptable location on the lower groove. Prior to flight, the riser control lines are pre-wound around the internal pulley. The pulley is then locked in place by the release mechanism. When the release mechanism is activated, the internal pulley rotates to release the pre-wound riser control lines and simultaneously pulls in the trailing edge control line. The smaller groove allows for minimal extension of the riser control lines while creating a significant change in the trailing edge control line causing brake deflection.

Other aspects, features, and advantages will become apparent to those skilled in the art from the detailed description and accompanying drawings. It should be understood, however, that the detailed description and accompanying drawings, while indicating preferred embodiments of the present invention, are given by way of illustration and not limitation.

DETAILED DESCRIPTION OF THE INVENTION

Figure 1:
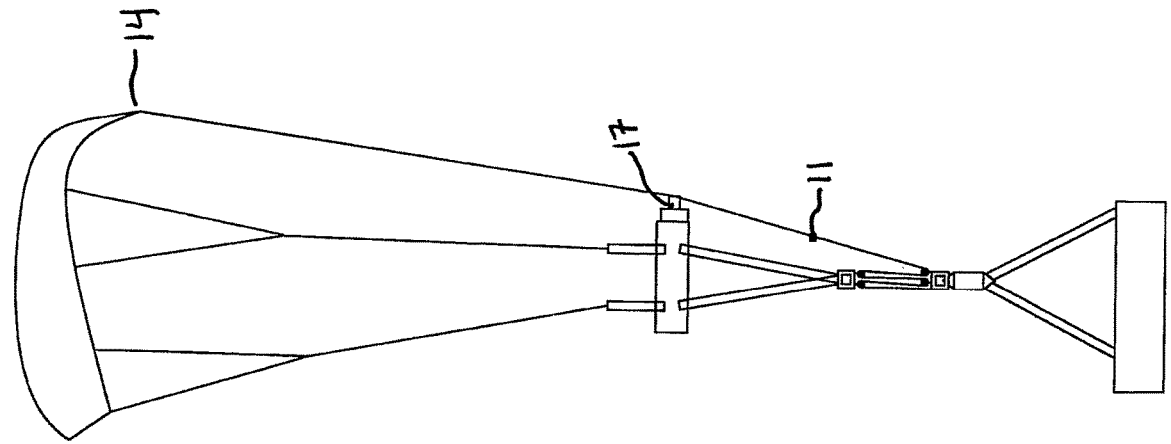
FIG. 1 a schematic representation of the present invention with a payload and parafoil.

FIG. 1 is a schematic representation of an embodiment of the present invention with a parafoil canopy 1 attached to suspension lines 5 and trailing edge control line 6. Trailing edge control line 6 is attached to the trailing edge 14 of canopy 1. The suspension lines 5 are further attached to risers 4. Risers 4 are attached to spreader 3. Release mechanism system 18 is connected or associated with spreader 3. Release mechanism system 18 further comprises release mechanism 17 and control line mechanism 11. Control line mechanism 11 is held in place on trailing edge control line 6 by release mechanism 17. The spreader 3 is further attached to upper payload slings 7. Upper payload slings 7 are further attached to upper link 9. Upper link 9 is connected or associated with purchase system 8. Purchase system 8 further comprises an upper purchase system 8a connected or associated with upper link 9 and a lower purchase system 8b connected or associated with lower link 13. Upper purchase system 8a and lower purchase system 8b are connected via control line 6. Lower link 13 is further attached to swivel 10 which is further connected or associated with lower payload slings 12. Lower payload slings 12 are then attached to the payload 2.

Figure 2:
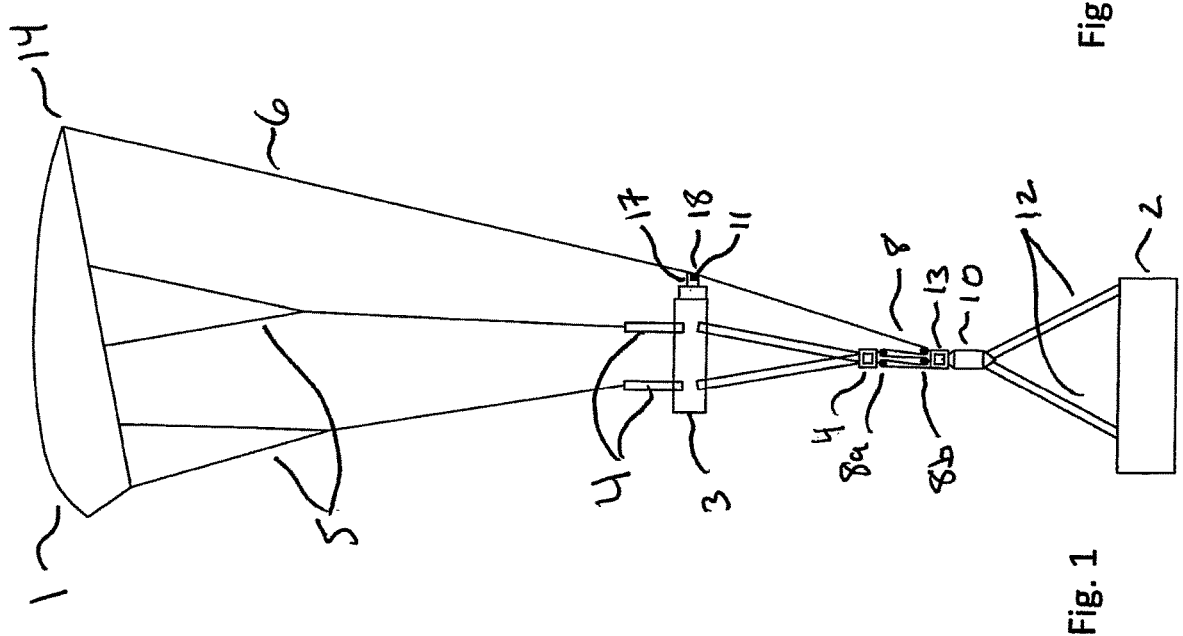
FIG. 2 is a schematic representation of the present invention wherein the one-time flare mechanism has been actuated.

FIG. 2 is a schematic representation of an embodiment of the present invention wherein control line mechanism 11 has been released by release mechanism 17 causing trailing edge 14 to deflect. The deflection of trailing edge 14 produces a one-time flare maneuver.

Figure 3:
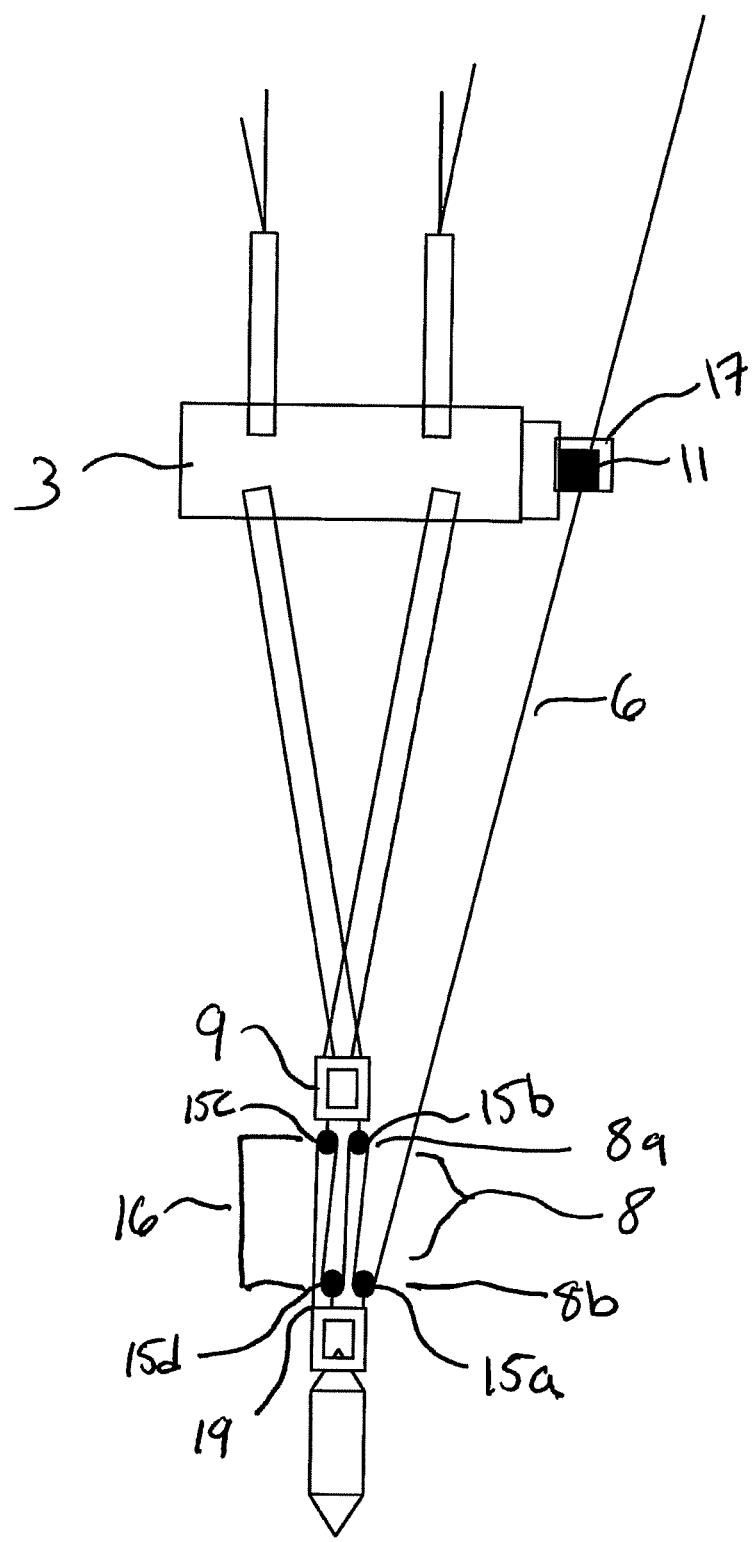
FIG. 3 is a schematic representation of a preferred embodiment of the purchase system of the present invention.

FIG. 3 is a schematic representation of a preferred embodiment of the purchase system 8 of the present invention. Purchase system 8 comprises upper purchase system 8a connected to link 9 and lower purchase system 8b connected to link 13. Upper purchase system comprises pulleys 15b and 15c, which are connected to link 9. Lower purchase system comprises pulleys 15a and 15d, which are connected to link 13. Trailing edge control line 6 is held by control line mechanism 11 at release mechanism 17 of the spreader 3. Trailing edge control line 6 is further threaded through pulleys 15a, 15b, 15c and 15d and attached to link 13 at the trailing edge control line terminus 19 creating purchase system length 16.

Figure 4:
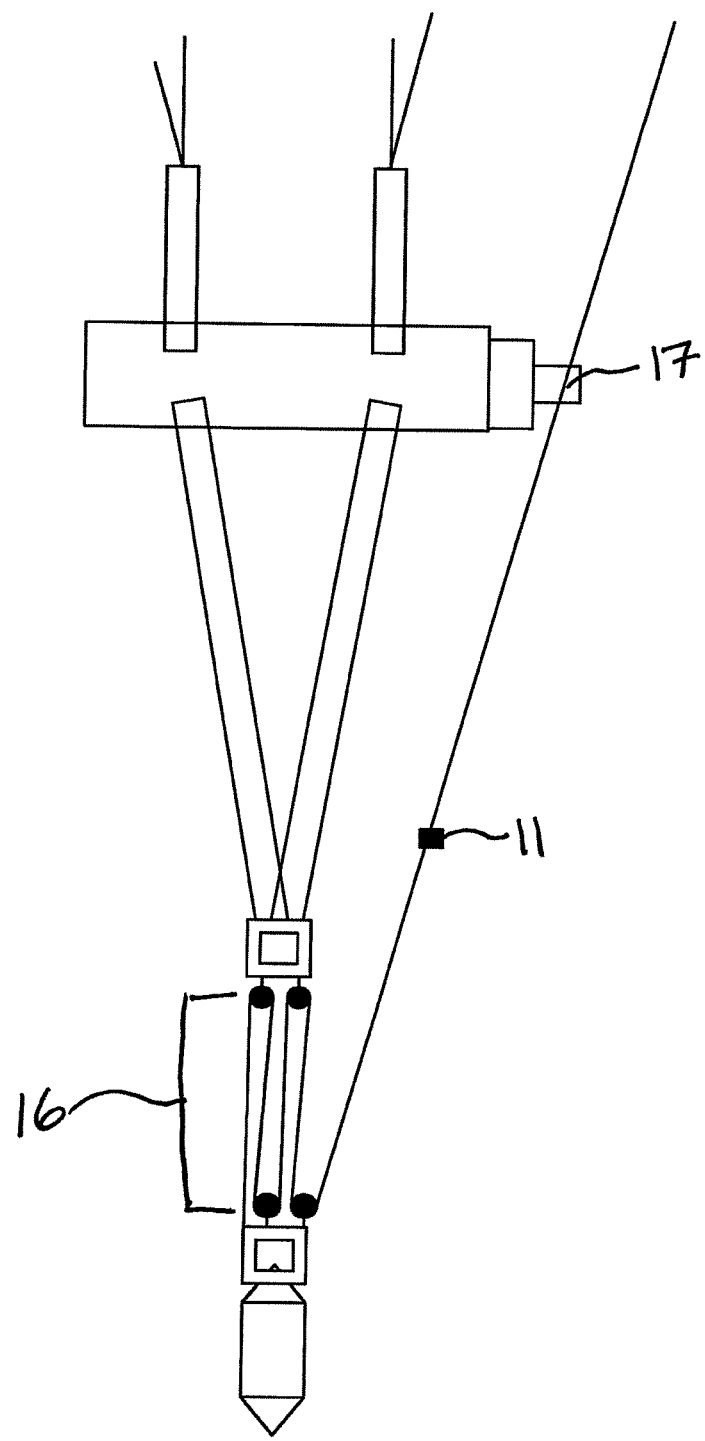
FIG. 4 is a schematic representation of a preferred embodiment of the purchase system of the present invention wherein the one-time flare mechanism has been actuated.

FIG. 4 is a schematic representation of a preferred embodiment of the purchase system 8 of the present invention wherein the one-time flare mechanism has been actuated. In the embodiment of FIG. 4, control line mechanism 11 has been released by release mechanism 17. The release of control line mechanism 11 extends purchase system length 16 in a manner which equalizes the load and avoids shock to the suspension lines 5.

Figure 5:
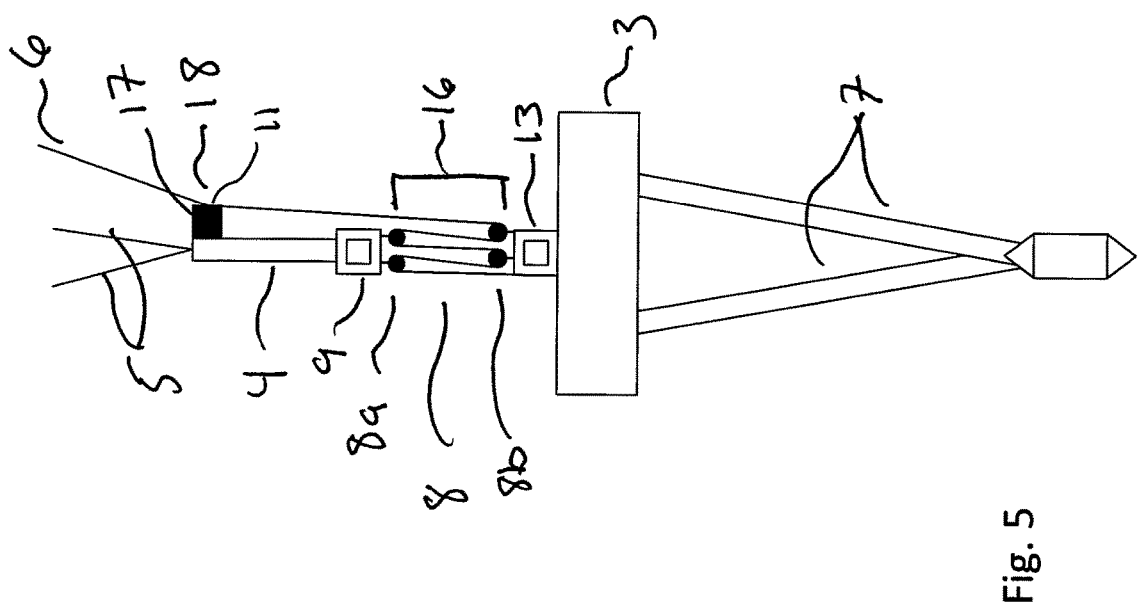
FIG. 5 is a schematic representation of a preferred embodiment of the purchase system of the present invention wherein the one-time flare mechanism is located above the spreader.

FIG. 5 is a schematic representation of a preferred embodiment of the present invention wherein purchase system 8 is located above spreader 3 and has not been actuated. In this embodiment, suspension lines 5 are attached to upper riser 4 which is attached or associated with upper link 9. Lower link 13 is attached or associated with spreader 3. Purchase system 8 is connected or associated with upper link 9 and lower link 13. Release mechanism system 18 is attached or associated with riser 4. Release mechanism system 18 further comprises release mechanism 17 and control line mechanism 11. Control line mechanism 11 is held in place on trailing edge control line 6 by release mechanism 17. Purchase system 8 further comprises an upper purchase system 8a connected to or associated with upper link 9 and a lower purchase system 8b connected to or associated with lower link 9. The distance between upper purchase 8a and lower purchase system 8b creates purchase system length 16. Spreader 3 is attached or associated with upper payload slings 7.

Figure 6:
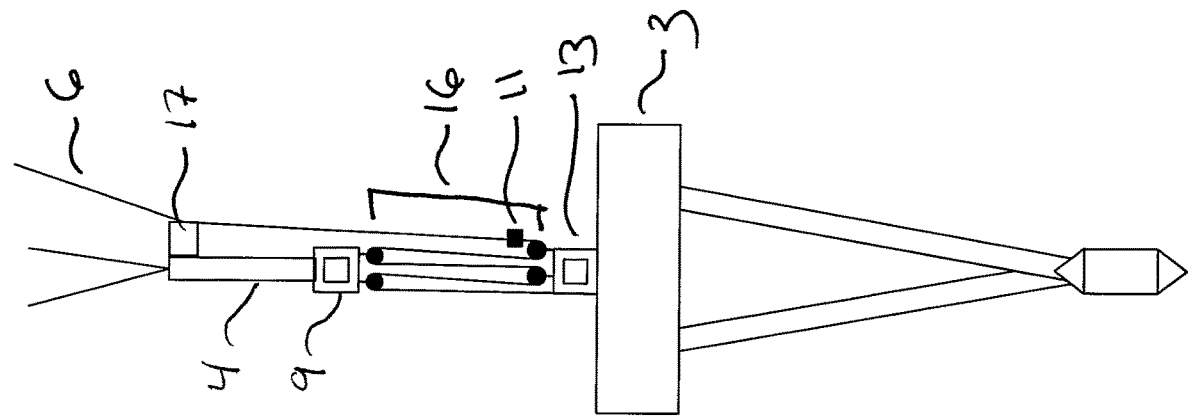
FIG. 6 is a schematic representation of a preferred embodiment of the purchase system of the present invention wherein the one-time flare mechanism is located above the spreader and has been actuated.

FIG. 6 is a schematic representation of a preferred embodiment of the present invention wherein purchase system 8 is located above spreader 3 and has been actuated. Control line mechanism 11 has been released by release mechanism 17 extending purchase system length 16 in a manner which produces a one-time flare maneuver and equalizes the load and avoids shock to the suspension lines 5.

Figure 7:
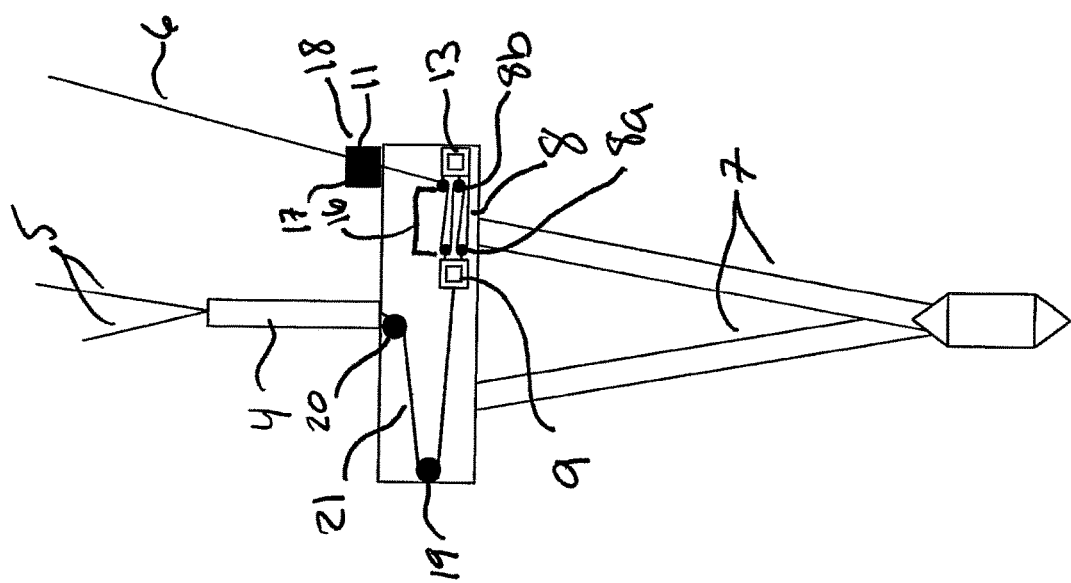
FIG. 7 is a schematic representation of a preferred embodiment of the purchase system of the present invention wherein the one-time flare mechanism is located within the spreader.

FIG. 7 is a schematic representation of a preferred embodiment of the present invention wherein purchase system 8 is located within spreader 3 and has not been actuated. In this embodiment, suspension lines 5 are attached to upper riser 4 which is attached or associated with upper link 9 via riser control line 21. Riser control line 21 is threaded from upper riser 4 to pulley 20. Pulley 20 is located within spreader 3. Riser control line 21 is then threaded through pulley 19, which is located within spreader 3, and is then attached or associated with upper link 9. In this embodiment, upper link 9 is not attached to spreader 3. Lower link 13 is attached to or associated with at least one wall of spreader 3. Purchase system 8 is connected to or associated with upper link 9 and lower link 13. Release mechanism system 18 is attached or associated with the spreader 3. Release mechanism system 18 further comprises release mechanism 17 and control line mechanism 11. Control line mechanism 11 is held in place on trailing edge control line 6 by release mechanism 17. Purchase system 8 further comprises an upper purchase system 8a attached to or associated with upper link 9 and a lower purchase system 8b is attached to or associated with lower link 9. The distance between upper purchase 8a and lower purchase system 8b creates purchase system length 16.

Figure 8:
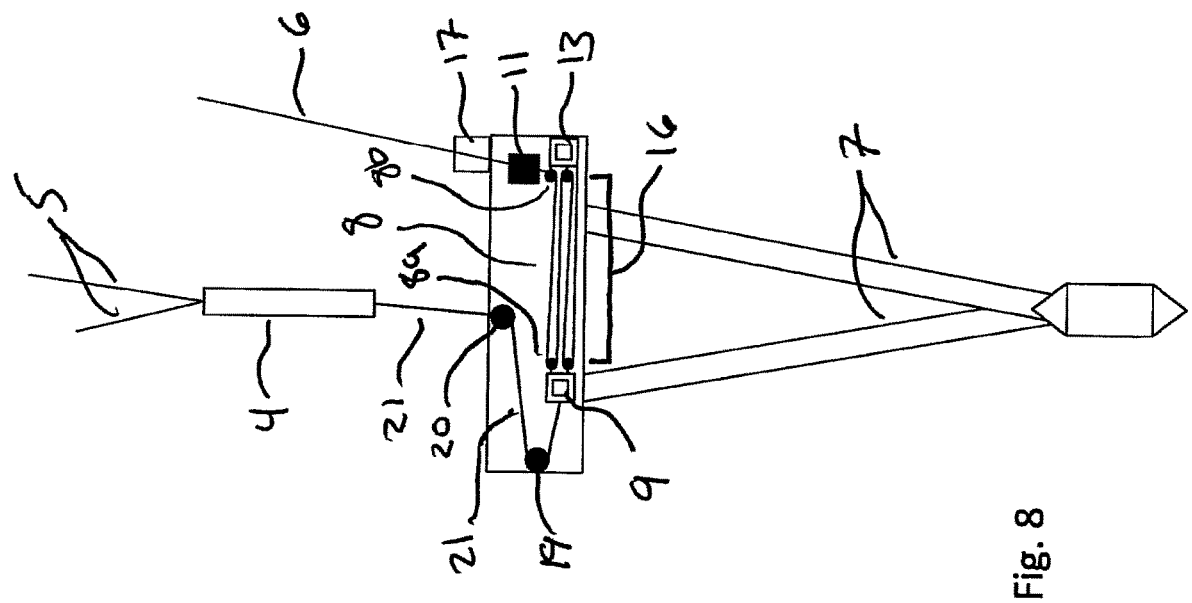
FIG. 8 is a schematic representation of a preferred embodiment of the purchase system of the present invention wherein the one-time flare mechanism is located above the within and has been actuated.

FIG. 8 is a schematic representation of a preferred embodiment of the present invention wherein purchase system 8 is located within spreader 3 and has been actuated. Control line mechanism 11 has been released by release mechanism 17 extending purchase system length 16 in a manner which produces a one-time flare maneuver. The increase in purchase system length 16 decreases the distance between upper link 9 and pulley 19 and increases the distance between riser 4 and pulley 20 thereby equalizing the load and avoiding shock to the suspension lines 5.

We claim:

1. A system to produce a one-time flare maneuver for a parafoil carrying a payload, the system comprising:
    a parafoil canopy comprising a trailing edge;
    a spreader;
    at least one trailing edge control line comprising an origin and a terminus wherein the origin of the trailing edge control line is attached to the trailing edge of the canopy;
    a release mechanism system further comprising:
        a release mechanism; and
        a control mechanism releasably attached to the release mechanism and attached to the trailing edge control line;
    at least one upper link;
    at least one lower link; and
    a purchase system further comprising:
        an upper purchase system attached to the upper link further comprising at least one device for receiving the trailing edge control line; and
        a lower purchase system attached to the lower link further comprising at least one device for receiving the at least one trailing edge control line, wherein the at least one trailing edge control line is threaded through the lower purchase system and then the upper purchase system, wherein the control mechanism is completely released from the release mechanism to produce the one-time flare.

2. The system of claim 1 wherein the at least one device for receiving the trailing edge control line is a pulley.

3. A system to produce a one-time flare maneuver for a parafoil carrying a payload, the system comprising:
    a parafoil canopy comprising a trailing edge;
    a spreader;
    at least one trailing edge control line comprising an origin and a terminus wherein the origin of the trailing edge control line is attached to the trailing edge of the canopy;
    at least one suspension line comprising an origin and a terminus wherein the origin of the suspension line is attached to the canopy;
    a release mechanism system further comprising:
        a release mechanism; and
        a control mechanism releasably attached to the release mechanism and attached to the trailing edge control line;
    at least one upper link;
    at least one lower link; and
    a purchase system further comprising:
        an upper purchase system attached to the upper link further comprising at least one device for receiving the trailing edge control line;

a lower purchase system attached to the lower link further comprising at least one device for receiving the at least one trailing edge control line, wherein the at least one trailing edge control line is threaded through the lower purchase system and then the upper purchase system; and at least one riser comprising a top and bottom, wherein the terminus of the at least one suspension line is attached to the top of the at least one riser and the bottom of the at least one riser is attached to the upper link, wherein the release mechanism is attached to the top of the one riser, the lower link is attached to the spreader and the terminus of the trailing edge control line is attached to the lower link.

4. The system of claim 3 wherein the at least one device for receiving the trailing edge control line is a pulley.

\* \* \* \* \*